3,252,993
N-ALKENYL CARBAZOLES
William A. Hewett, Saratoga, Calif., assignor to International Business Machines Corporation, New York, N.Y., a corporation of New York
No Drawing. Filed Aug. 26, 1963, Ser. No. 304,688
5 Claims. (Cl. 260—315)

The present invention generally relates to new organic compounds and more particularly relates to new 9-alkenyl substituted carbazoles and a method of making the same.

Carbazole is a well known nitrogen-containing compound, also known as dibenzopyrrole or diphenylenimine, having the following structural formula:

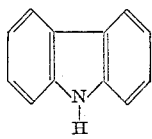

Carbazole has a melting point of about 244°–246° C. and a boiling point of 352°–354° C., is soluble in alcohol and ether and is insoluble in water. It is commercially used in the manufacture of carbazole-type dyes and is also used as a chemical reagent. Thus, it has been employed in the manufacture of explosives, insecticides, fungicides, lubricants, rubber antioxidants and the like, and is employed as an odor inhibiter in detergents. Carbazole can be obtained from crude anthracene cake by selective solution of phenanthrene with crude solvent naphtha, followed by removal of the phenanthrene by its conversion into a sulfonic derivative and then extraction by water. Carbazole can also be synthetically produced from ortho-amino diphenyl.

In view of the increasing utility of carbazole for various reactions, including a variety of syntheses and the like, it would be desirable to provide carbazole derivatives capable of yielding new chemical products with suitable chemical and physical characteristics.

Accordingly, it is the principal object of the present invention to provide novel carbazole derivatives.

It is also an object of the present invention to provide a method of preparing novel carbazole derivatives.

It is a further object of the present invention to provide new substituted carbazoles capable of acting as intermediates in the production of new chemical products having desirable physical and chemical characteristics.

It is also an object of the present invention to provide a simple, effective and economical method for the preparation of such new substituted carbazoles.

These and other objects are accomplished, in accordance with the present invention, by the preparation of new and useful carbazole derivatives in accordance with the present method. The carbazole derivatives are characterized by alkenyl substituents having a carbon chain length of at least 5 carbon atoms and up to about 23 carbon atoms. The alkenyl-substituted carbazoles are 9-alkenyl substituted carbazoles and have been found to be useful as intermediates in the preparation of a wide range of new types of polymeric materials which can be used for insulation purposes, coatings, etc., and also for the production of suitable polymeric-containing products, for example photoconductors and the like.

The 9-alkenyl substituted carbazoles are also suitable for use in the production of agricultural chemicals, including insecticides, fungicides and the like, pharmaceutical preparations and other chemicals, since they are highly reactive. Their reactivity, in part, depends upon the presence therein of a double bond at which chemical reaction, both of the free radical type and of the ionic type, can take place. Moreover, active substitution can take place on the aromatic nucleus. In addition, the nitrogen atom can be oxidized.

Thus, for example, the 9-alkenyl substituted carbazoles are capable of introducing dye sites into polymers, when copolymerized with polypropylene and the like. Accordingly, they are useful for a variety of purposes, including preparation of chemical products of desired physical and chemical characteristics.

In general, the method of the present invention comprises introducing an alkenyl substituent into carbazole through the nitrogen linkage thereof under controlled conditions, particularly by a substitution reaction between a 9-alkali metal-substituted carbazole and a halogen-containing alkenyl compound. The alkenyl substituent is of a minimum carbon chain length of 5 carbon atoms and a maximum carbon chain length of 23 carbon atoms, which has been found to be effective for the described substitution reaction.

When the present method is extended to the preparation of 9-alkenyl-substituted carbazoles which have alkenyl substituents of lower carbon chain length than 5 carbon atoms certain difficulties are encountered. For example, when it is attempted to prepare substituted carbazoles having alkenyl substituents of a carbon chain length of 4 carbon atoms by the present method, butadiene-type products result from an elimination reaction, effectively preventing an appreciable yield of product. Accordingly, for the purposes of the present invention, the lower limit of the carbon chain of the alkenyl substituents is fixed at 5 carbon atoms.

Moreover, when it is attempted to prepare by the present method those 9-alkenyl substituted carbazoles the alkenyl substituents of which have carbon chain lengths in excess of 23 carbon atoms, practical difficulties are encountered in carrying out the reaction. Accordingly, the upper limit of the carbon chain length of the alkenyl substituents of the alkenyl-substituted carbazoles prepared by the present method is fixed, for practical considerations, at 23 carbon atoms.

The new compounds to which the present invention is directed are thus characterized by the following structural formula:

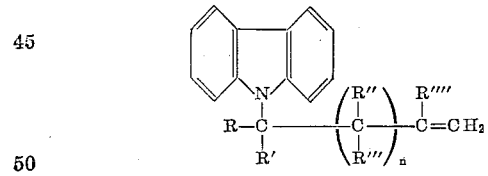

where $n=2-20$ and where R, R', R'', R''' and R'''' are substituents selected from the group consisting of hydrogen, alkyl, aryl and substituted alkyl aryl substituents.

The method of the present invention is characterized by reacting a 9-alkali metal-substituted carbazole of the structural formula:

where X is selected from the group consisting of sodium, potassium and lithium with a monohalogenated alkene having the following structural formula:

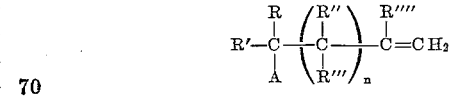

where $n=2-20$, where R, R', R'', R''' and R'''' are substituents selected from the group consisting of hydrogen, alkyl, aryl and substituted alkylaryl substituents, and where A is selected from the group consisting of chlorine, bromine and iodine. The desired substitution reaction is carried out under non-oxidizing conditions, such as a nitrogen atmosphere, and under anhydrous conditions so as to result in the desired new above-described 9-alkenyl-substituted carbazoles. The present method may also include the preparation of the 9-alkali metal-substituted carbazoles utilized in the reaction.

As a specific example, 9-(4-pentenyl) carbazole, having the following structural formula, has been successfully produced in accordance with the method of the present invention:

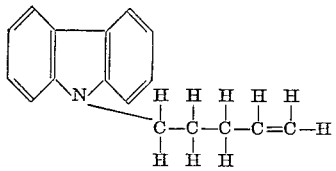

In this regard, carbazole was first reacted with sodium hydride at room temperature while dissolved in tetrahydrofuran and under non-oxidizing conditions, e.g. a nitrogen blanket, and while under anhydrous conditions to prepare 9-sodium substituted carbazole having the following structural formula:

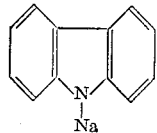

This product was then reacted with 5-monobromo-1-pentene, having the structural formula

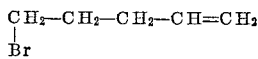

at about 70° C. in tetrahydrofuran under a nitrogen blanket and under anhydrous conditions to obtain the desired 9-(4-pentenyl) carbazole. 9-(4-pentenyl) carbazole is suitable for the preparation of pentenyl carbazole polymers capable of being used in electrical insulation, and for many other purposes.

The foregoing and other objects, features and advantages of the invention will be apparent from the following more particular description of preferred embodiments of the invention.

In accordance with the present method, carbazole can be reacted to prepare 9-alkali metal-substituted carbazole. Such reaction can be effected by contacting carbazole with a reactive alkali metal compound such as a hydride, in a suitable reaction medium, such as solvent for the carbazole, for example, tetrahydrofuran, toluene, benzene, etc., under the described non-oxidizing, anhydrous conditions. The alkali metal compound is selected from the group consisting of reactive compounds of potassium, sodium and lithium. Such compounds may include sodium hydride, potassium hydride, lithium hydride and the like.

Such alkali metal substituted carbazole is then reacted at any suitable reaction temperature, for example, about 70° C. under the afore-described non-oxidizing, anhydrous conditions and in a mutual solvent such as tetrahydrofuran with a monohalogenated alkene having the structural formula set forth above, namely:

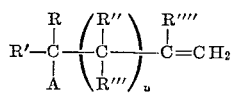

where $n=2–20$, where R, R′, R″, R‴ and R″″ are substituents selected from the group consisting of hydrogen, alkyl, aryl and substituted alkylaryl substituents and where A is selected from the group consisting of chlorine, bromine and iodine. Preferably, the halogen of the alkene is bromine or chlorine, although it may be iodine. It will be noted that the alkene has a terminal double bond.

The described reaction is carried to completion within, for example, about 20 hours. The product is separated from the reactants, catalyst and reaction medium upon completion of the reaction.

The described substitution reaction comprises removal of the halogen from the monohalogenated alkene and simultaneous removal of the alkali metal from the 9-alkali metal-substituted carbazole, with condensation of the alkene and carbazole to form the desired 9-alkenyl substituted carbazole, as set forth in the following:

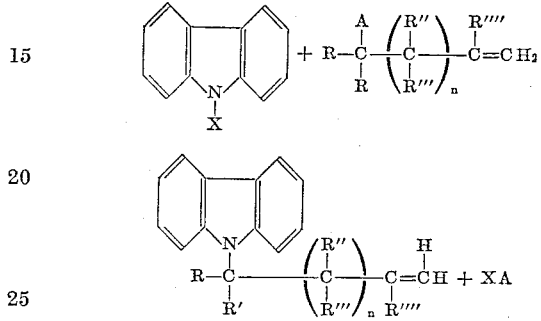

wherein $n=2–20$, where R, R′, R″, R‴ and R″″ are selected from the group consisting of hydrogen, alkyl, aryl and substituted alkylaryl substituents and A=chlorine, bromine or iodine.

Preparation of alkenyl substituted carbazole, in accordance with the method of the present invention, is efficient and yields of about 60%, by weight, or more of the desired 9-alkenyl substituted carbazoles having alkenyl-carbon chain lengths of 5 to 23 carbon atoms have been obtained.

In order to obtain a purified product, separation of the 9-alkenyl substituted carbazole product from reactants, reaction medium (solvent) and any other constituents can be carried out in any suitable manner, as previously indicated. The manner of separation will depend upon the particular reactants, medium and product. As an example of a typical purification procedure, a portion of the tetrahydrofuran or other medium can be removed from a reaction mixture containing 9-(6-heptenyl) carbazole by vacuum distillation, for example, at 65° C. and 25 mm. Hg pressure. This allows the solvent plus unreacted alkenyl halide to be removed. The resulting mixture can be cooled to crystallize out the 9-(6-heptenyl) carbazole product. This product can then be further purified by water-ether extraction and recrystallization of the ether extract, after ether removal, from a suitable medium, followed by evaporation of residual solvent. It will be understood that comparable separation and purification procedures can be employed. The following examples further illustrate certain features of the present invention.

*Example 1*

9-(4-pentenyl) carbazole is prepared from carbazole by a two stage procedure. In the first stage, 9-sodium carbazole is prepared from carbazole under anhydrous conditions and under a nitrogen blanket. In this regard, about 8.4 grams of anhydrous carbazole in 60 ml. of anhydrous tetrahydrofuran are added to 1.3 grams of anhydrous sodium hydride in 60 ml. of anhydrous tetrahydrofuran at about room temperature and under agitation. Agitation is maintained until the reaction is completed in 90 minutes. Approximately 8.5 grams of 9-sodium carbazole are produced.

Thereafter, the mixture containing the 9-sodium carbazole in the tetrahydrofuran is heated under a nitrogen blanket and under anhydrous conditions to refluxing temperature and to it is added dropwise 9 grams of anhydrous 5-bromo-1-pentene in 20 ml. of anhydrous tetrahydrofuran. The resulting mixture is maintained under agitation at about 70° C. until the desired substitution reaction is completed, that is, in about 20 hours. Thereafter, the product is separated from the solvent (reaction medium) and reactants by the following procedure. The mixture is first poured into ice water, then extracted three times (3 portions) with diethyl ether. The combined extract is then evaporated to dryness, crystallized and recrystallized out of methanol. Approximately 6 grams of purified product are obtained. This product is identified by combustion analysis as essentially pure 9-(4-pentenyl) carbazole having the following chemical and physical characteristics: M.P.=46.5–47° C., appearance=white needles.

Analysis for $C_{17}H_{17}N$ (mol. wt.=235): Calculated: C=86.76; H=7.28; N=5.96. Found: C=86.57; H=7.61; N=5.74. (Analysis by Berkeley Analytical Laboratories, Berkeley, California.)

*Example II*

9-(5-hexenyl) carbazole is prepared in accordance with the following procedure:

Approximately 55 gm. of carbazole in 400 ml. of anhydrous tetrahydrofuran are added dropwise to a 400 ml. portion of the same anhydrous solvent containing 9 gm. of sodium hydride while the reaction zone is under a nitrogen blanket. The resulting mixture is maintained under anhydrous, non-oxidizing conditions at 25° C. and under agitation for 3 hours, that is, until the reaction between the carbazole and the selected alkali metal hydride is completed. Approximately 55 gm. of 9-sodium carbazole is thus prepared.

The mixture containing the 9-sodium carbazole in the aforesaid anhydrous solvent is then treated under non-oxidizing, anhydrous conditions by heating it to about 70° C., and adding to it at a slow rate 65 gm. of anhydrous monohalogenated alkene, 6-bromo-1-hexene, disposed in 100 ml. of anhydrous tetrahydrofuran, the reaction taking place under a nitrogen blanket. The addition of the monohalogenated alkene to the 9-sodium carbazole is also carried out under agitation. The resulting mixture is maintained under non-oxidizing anhydrous conditions at a temperature of about 70° C., while under agitation, for about 20 hours, that is until the desired substitution reaction is completed.

Thereafter, the product is separated from the solvent (reaction medium), reactants and other constituents by a procedure substantially identical to that set forth in Example I. Approximately 36 gm. of purified product are thus obtained. This product is identified by chemical analysis as consisting essentially of 9-(5-hexenyl) carbazole having the following chemical and physical characteristics: melting point=76–76.5° C., appearance=white needles, soluble in benzene.

Analysis of $C_{18}H_{19}N$ (mol. wt.=249.3): Calculated: C=86.70; H=7.68; N=5.62. Found: C=86.70; H=7.57; N=5.50. (Analysis by Berkeley Analytical Laboratories, Berkeley, California.)

*Example III*

9-(4-pentenyl) carbazole is prepared in accordance with the following procedure:

All reactions are carried out under anhydrous conditions and under a nitrogen blanket. Approximately 8.4 gm. of carbazole in 60 ml. of tetrahydrofuran are added dropwise to a 60 ml. portion of the same solvent containing 58 ml. of a 0.86 molar solution of n-butyllithium. The resulting mixture is maintained at 23° C. under agitation for 1.5 hours, that is, until the reaction between the carbazole and the selected metal alkyl is completed. Approximately 8.5 gm. of 9-lithium carbazole is thus prepared.

The mixture containing the 9-lithium carbazole in the aforesaid solvent is then heated to about 70° C., and to it is added at a slow rate to 6.3 gm. of the monohalogenated alkene, 5-chloro-1-pentene, disposed in 20 ml. of tetrahydrofuran. The addition of the monohalogenated alkene to the 9-lithium carbazole is carried out under agitation. The resulting mixture is maintained at a temperature of about 70° C. under agitation for about 20 hours, that is until the desired substitution reaction is completed.

Thereafter, the product is separated from the solvent (reaction medium), reactants, and other constituents according to the same procedure as called for in Example I. Approximately 5.9 gm. of purified product are thus obtained. This product is identified by chemical analysis as consisting essentially of pure 9-(4-pentenyl) carbazole having the following chemical and physical characteristics: melting point=46.5–47° C., appearance=white needles, soluble in benzene.

This new alkenyl-substituted carbazole is useful in the preparation of various carbazole derivatives, other chemicals, such as agricultural chemicals, insecticides and the like.

*Example IV*

9-(5-hexenyl) carbazole is prepared in accordance with the following procedure:

All reactions are carried out under anhydrous conditions and under a nitrogen blanket. Approximately 55 gm. of carbazole in 400 ml. of tetrahydrofuran are added dropwise to a 400 ml. portion of the same solvent containing 9 gm. of sodium hydride. The resulting mixture is maintained at 25° C. under agitation for 3 hours, that is, until the reaction between the carbazole and the selected alkali metal hydride is completed. Approximately 55 gm. of 9-sodium is thus prepared.

The mixture containing the 9-sodium carbazole in the aforesaid solvent is then heated to about 70° C., and to it is added at a slow rate 4.75 gm. of the monohalogenated alkene, 6-chloro-1-hexene, disposed in 100 ml. of tetrahydrofuran. The addition of the monohalogenated alkene to the 9-sodium carbazole is carried out under agitation. The resulting mixture is maintained at a temperature of about 70° C. under agitation for about 20 hours, that is, until the desired substitution reaction is completed.

Thereafter, the product is separated from the solvent (reaction medium), reactants and other constituents by the same procedure as in Example I. Approximately 35 gm. of purified product are thus obtained. This product is identified by chemical analysis as consisting essentially of pure 9-(5-hexenyl) carbazole having the following chemical and physical characteristics: melting point=76–76.5° C., appearance=white needles, soluble in benzene.

This new alkenyl-substituted carbazole is useful in the preparation of various carbazole derivatives, agricultural and pharmaceutical chemicals, other chemicals, intermediates, polymers and polymer-containing compounds.

*Example V*

9-(4-pentenyl) carbazole is prepared in accordance with the following procedure:

All reactions are carried out under anhydrous conditions and under a nitrogen blanket. Approximately 8.4 gm. of carbazole in 60 ml. of tetrahydrofuran are added dropwise to a 60 ml. portion of the same solvent containing 1.3 gm. of sodium hydride. The resulting mixture is maintained at 23° C. under agitation for 1.5 hours, that is, until the reaction between the carbazole and the selected alkali metal hydride is completed. Approximately 8.5 gm. of 9-sodium carbazole is thus prepared.

The mixture containing the 9-sodium carbazole in the aforesaid solvent is then heated to about 70° C., and to it is added at a slow rate 11.8 gm. of the monohalogenated alkene, 5-iodo-1-pentene, disposed in 40 ml. of tetrahydrofuran. The addition of the monohalogenated alkene to the sodium carbazole is carried out under agitation. The resulting mixture is maintained at a temperature of about 70° C. under agitation for about 20 hours, that is, until the desired substitution reaction is completed.

Thereafter, the product is separated from the solvent (reaction medium), reactants and other constituents by the same procedure as in Example I. Approximately 5.5 gm. of purified product are thus obtained. This product is identified by chemical analysis as consisting essentially of pure 9-(4-pentenyl) carbazole having the following chemical and physical characteristics: melting point=46.5–47° C., appearance=white needles.

This new 9-alkenyl-substituted carbazole is useful, as previously described in Examples I and III.

*Example VI*

9-(5-hexenyl) carbazole is prepared in accordance with the following procedure:

All reactions are carried out under anhydrous conditions and under a nitrogen blanket. Approximately 55 gm. of carbazole in 400 ml. of tetrahydrofuran are added dropwise to a 400 ml. portion of the same solvent containing 9 gm. of sodium hydride. The resulting mixture is maintained at 25° C. under agitation for 3 hours, that is, until the reaction between the carbazole and the selected alkali metal hydride is completed. Approximately 55 gm. of 9-sodium carbazole is thus prepared.

The mixture containing the 9-sodium carbazole in the aforesaid solvent is then heated to about 70° C., and to it is added at a slow rate 84 gm. of the monohalogenated alkene, 6-iodo-1-hexene, disposed in 100 ml. of tetrahydrofuran. The addition of the monohalogenated alkene to the 9-sodium carbazole is carried out under agitation. The resulting mixture is maintained at a temperature of about 70° C. under agitation for about 20 hours, that is, until the desired substitution reaction is completed.

Thereafter, the product is separated from the solvent (reaction medium), reactants and other constituents by the procedure set forth in Example I. Approximately 25 gm. of purified product are thus obtained. This product is identified by chemical analysis as consisting essentially of pure 9-(5-hexenyl) carbazole having the following chemical and physical characteristics: melting point= 76–76.5° C., appearance=white needles, soluble in benzene.

This new 9-alkenyl-substituted carbazole is useful, as previously described in Examples II and IV.

*Example VII*

9-(4-methyl-4-pentenyl) carbazole is prepared in accordance with the following procedure:

All reactions are carried out under anhydrous conditions under a nitrogen blanket. Approximately 8.4 gm. of carbazole in 60 ml. of tetrahydrofuran are added dropwise to a 60 ml. portion of the same solvent containing 1.3 gm. of sodium hydride. The resulting mixture is maintained at 23° C. under agitation for 1.5 hours, that is, until the reaction between the carbazole and the selected alkali metal hydride is completed. Approximately 8.5 gm. of 9-sodium carbazole is thus prepared.

The mixture containing the 9-sodium carbazole in the aforesaid solvent is then heated to about 70° C., and added at a slow rate to 10 gm. of the monohalogenated alkene, 5-bromo-2-methyl-pentene-1, disposed in 20 ml. of tetrahydrofuran. The addition of the 9-sodium carbazole to the monohalogenated alkene is carried out under agitation. The resulting mixture is maintained at a temperature of about 70° C. under agitation for about 20 hours, that is, until the desired substitution reaction is completed.

Thereafter, the product is separated from the solvent (reaction medium), reactants and other constituents by the procedure set forth in Example I. Approximately 5 gm. of purified product are thus obtained. This product is identified by chemical analysis as consisting essentially of pure 9-(4-methyl-4-pentenyl) carbazole having the appearance of white needles.

This new 9-alkenyl-substituted carbazole is useful in the preparation of various carbazole derivatives, other chemicals, including agricultural and pharmaceutical chemicals, and polymers and polymer-containing compounds, for example, poly 9-(4-methyl)-4-pentenyl carbazoles useful in various polymeric products, such as structural components, etc.

*Example VIII*

9-(10-undecenyl) carbazole is prepared in accordance with the following procedure:

All reactions are carried out under anhydrous conditions and under a nitrogen blanket. Approximately 3.4 gm. of carbazole in 60 ml. of tetrahydrofuran therefore are added dropwise to a 60 ml. portion of the same solvent containing 1.3 gm. of sodium hydride. The resulting mixture is maintained at 23° C. under agitation for 1.5 hours, that is, until the reaction between the carbazole and the selected alkali metal hydride is completed. Approximately 8.5 gm. of 9-sodium carbazole is thus prepared.

The mixture containing the 9-sodium carbazole in the aforesaid solvent is then heated to about 70° C., and to it is added at a slow rate 14 gm. of the monohalogenated alkene, 11-bromo-1-undecene, disposed in 40 ml. of tetrahydrofuran. The addition of the monohalogenated alkene to the sodium carbazole is carried out under agitation. The resulting mixture is maintained at a temperature of about 70° C. under agitation for about 20 hours, that is, until the desired substitution reaction is completed.

Thereafter, the product is separated from the solvent (reaction medium), reactants and other constituents by the procedure set forth in Example I. Approximately 8 gm. of purified product are thus obtained. This product is identified by chemical analysis as consisting essentially of pure 9-(10-undecenyl) carbazole having the appearance of white needles.

This new 9-alkenyl-substituted carbazole is useful in the preparation of various carbazole derivatives, other chemicals, polymers and polymer-containing compounds, for example, poly 9-(10-undecenyl) carbazoles useful in electrical insulation.

*Example IX*

9-(22-tricosenyl) carbazole is prepared in accordance with the following procedure:

All reactions are carried out under anhydrous conditions and under a nitrogen blanket. Approximately 8.4 gm. of carbazole in 60 ml. of tetrahydrofuran solvent are added dropwise to a 60 ml. portion of the same solvent containing 1.3 gm. of sodium hydride. The resulting mixture is maintained at 23° C. under agitation for 1.5 hours, that is, until the reaction between the carbazole and the selected alkali metal hydride is completed. Approximately 8.5 gm. of 9-sodium carbazole is thus prepared.

The mixture containing the 9-sodium carbazole in the aforesaid solvent is then heated to about 70° C., and to it is added at a slow rate 24 gm. of the monohalogenated alkene, 2,3-bromo-1-tricosene, disposed in 40 ml. of tetrahydrofuran reaction medium. The addition to the sodium carbazole of the monohalogenated alkene is carried out under agitation. The resulting mixture is maintained at a temperature of about 70° C. under agitation for about 20 hours, that is, until the desired substitution reaction is completed.

Thereafter, the product is separated from the solvent (reaction medium), reactants and other constituents by the procedure set forth in Example I. Approximately 10 gm. of purified product are thus obtained. This product is identified by chemical analysis as consisting essentially of pure 9-(22-tricosenyl) carbazole.

This new 9-alkenyl-substituted carbazole is useful in the preparation of various carbazole derivatives, other chemicals, polymers and polymer-containing compounds, for example, poly 9-(22-tricosenyl) carbazoles useful for the preparation of photoconductors.

Example X 9-(10-phenyl-10-undecenyl) carbazole is prepared in accordance with the following procedure:

All reactions are carried out under anhydrous conditions and under a nitrogen blanket. Approximately 8.4 gm. of carbazole in 60 ml. of tetrahydrofuran solvent are added dropwise to a 60 ml. portion of the same solvent containing 1.3 gm. of sodium hydride. The resulting mixture is maintained at 23° C. under agitation for 1.5 hours, that is, until the reaction between the carbazole and the selected alkali metal hydride is completed. Approximately 8.5 gm. of 9-sodium carbazole is thus prepared.

The mixture containing the 9-sodium carbazole in the aforesaid solvent is then heated to about 70° C., and added at a slow rate to 18.5 gm. of the monohalogenated alkene, 2-phenyl-11-bromo-undecene-1, disposed in 60 ml. of tetrahydrofuran reaction medium. The addition of the monohalogenated alkene to the 9-sodium carbazole is carried out under agitation. The resulting mixture is maintained at a temperature of about 70° C. under agitation for about 20 hours, that is, until the desired substitution reaction is completed.

Thereafter, the product is separated from the solvent (reaction medium), reactants and other constituents by the procedure as set forth in Example I. Approximately 12 gm. of purified product are thus obtained. This product is identified by chemical analysis as consisting essentially of pure 9-(10-phenyl-10-undecenyl) carbazole.

This new 9-alkenyl-substituted carbazole is useful in the preparation of various carbazole derivatives, other chemicals, polymers and polymer-containing compounds, for example, poly 9-(10-phenyl-10-undecenyl) carbazoles suitable for use in electrical insulation.

Preceding Examples I to X, inclusive, clearly illustrate that the new 9-alkenyl-substituted carbazoles of the present invention, containing alkenyl substituents having carbon chain lengths of from 5 to 23 carbon atoms can be efficiently and easily prepared in substantial yield by the present method. The examples also clearly illustrate that various reaction parameters can be employed in the present method. Moreover, various reactants, including sodium carbazole, potassium carbazole and lithium carbazole can be used in the method. The halogenated alkenes employed in the method can contain chlorine, bromine or iodine atoms, and can be otherwise unsubstituted or can carry alkyl, and/or aryl and/or alkylaryl substituents. Accordingly, the 9-alkenyl substituted carbazoles prepared by the present method can have unsubstituted alkenyl substituents or alkenyl substitutents which themselves carry alkyl and/or aryl and/or alkylaryl substituents.

The 9-alkenyl substituted carbazoles of the present invention have a wide range of physical and chemical characteristics and are suitable for use in various chemical reactions. Thus, they can be used to prepare pharmaceuticals, dyes, insecticides, fungicides and other chemical products. Accordingly, the alkenyl-substituted carbazoles of the present invention form a new and well defined class of chemical compounds capable of being prepared by the present method.

As more particularly set forth in copending United States application for Letters Patent, Serial No. 304,697, filed August 26, 1963, for "Polymeric Materials and Method of Making the Same," of which William A. Hewett is the inventor, said application having been assigned to the assignee of the present application, the present 9-alkenyl-substituted carbazoles can be polymerized through their double bonds to polymers of various molecular weights and having monomeric unit multiplications of, for example, 10-1000. Such polymers can be homopolymers or copolymers or the like in tactic or atactic form, depending upon particular polymerization conditions. As an example, 9-(3-heptenyl) carbazole can be reacted at 0-70° C. with a suitable polymerization catalyst, for example diethyl aluminum chloride and titanium trichloride, in a weight concentration of the substituted carbazole to the catalyst of 10-200:1-3, while suspended in an organic solvent for the carbazole, such as toluene. The thus-produced polymer, depending upon its characteristics, can then be converted to fiber form, or can be used as an insulator, coating material, binder or the like.

In addition, this alkenyl-substituted carbazole in polymeric form can be sensitized to produce an improved photoconductor, as more particularly set forth in copending United States application for Letters Patent, Serial No. 304,687, filed August 26, 1963, and entitled "Photoconductors and Method of Making the Same," of which William A. Hewett and Alfred H. Sporer are the inventors, said application having been assigned to the assignee of the present application. As an example, when 9-(6-heptenyl) carbazole polymerized to a monomeric unit length of 500 is reacted with a selected sensitizer, 2,5-diphenyl quinone (for example, in a 3% by weight, concentration), a crystallizable product is prepared which exhibits increased electrical conductivity when exposed to light in the visible region of the photospectrum, as opposed to its electrical conductivity in the absence of such light. Appparently, the sensitizer complexes with the aromatic units of the polymer so as to improve the sensitivity of the polymer to visible light and thereby improve the utility of the product. The product can be coated on an aluminum base plate and charged in the dark to a voltage of about 600 volts. Upon exposure to visible light, as from a high pressure mercury arc source, the electrical resistance of the film of coating suddenly decreases, allowing the discharge of about ½ of the voltage through the film within a few milliseconds.

Accordingly, the 9-alkenyl-substituted carbazoles of the present invention are new and useful chemicals and can be readily prepared in substantial yield by the present method. Other advangtages of the invention are as set forth in the foregoing.

While the invention has been particularly shown and described with reference to preferred embodiments thereof, it will be understood by those skilled in the art that variations in form may be made therein without departing from the spirit and scope of the invention.

What is claimed is:

1. 9-alkenyl substituted carbazole having the formula

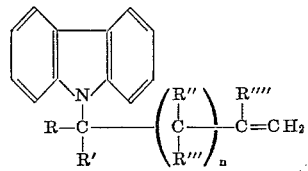

wherein $n=2$–$20$ and wherein R, R', R'', R''' and R'''' are substituents selected from the group consisting of lower alkyl, phenyl and hydrogen substituents.

2. 9-alkenyl substituted carbazole having the formula

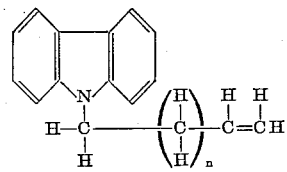

wherein $n=2$–$20$.

3. 9-(4-pentenyl) carbazole having the formula
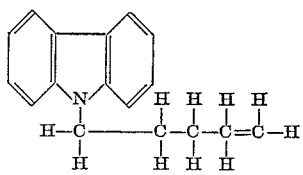
4. 9-(5-hexenyl) carbazole having the formula
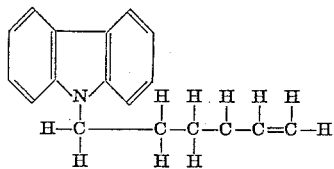
5. 9-(6-heptenyl) carbazole having the formula
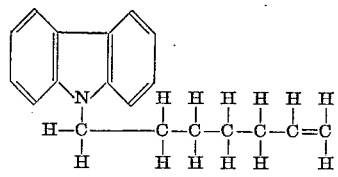
References Cited by the Examiner
FOREIGN PATENTS
811,643   4/1959   Great Britain.
OTHER REFERENCES
Levy: "Monatsh," vol. 33, pp. 177–84 (1912).
WALTER A. MODANCE, *Primary Examiner.*
JOHN D. RANDOLPH, R. T. BOND, *Examiners.*